United States Patent [19]
Maravetz

[11] 3,859,313
[45] Jan. 7, 1975

[54] UREA DERIVATIVES OF FURFURYL AND PYRANYLMETHYL COMPOUNDS

[75] Inventor: Lester L. Maravetz, Westfield, N.J.

[73] Assignee: Mobil Oil Corporation, New York, N.Y.

[22] Filed: June 20, 1972

[21] Appl. No.: 264,696

[52] U.S. Cl......... 260/347.3, 260/345.7, 260/247.2, 260/293.67, 260/326.3, 71/94, 71/95, 71/88
[51] Int. Cl. ........................... C07d 5/14, C07d 7/10
[58] Field of Search...................... 260/347.3, 345.7

[56] References Cited
OTHER PUBLICATIONS
Tiwari et al., Chem. Abstracts, (1963), Vol. 66, 3450 c.

*Primary Examiner*—Henry R. Jiles
*Assistant Examiner*—Bernard I. Dentz
*Attorney, Agent, or Firm*—Andrew L. Gaboriault; Hastings S. Trigg

[57] ABSTRACT

There are provided compounds having the formula:

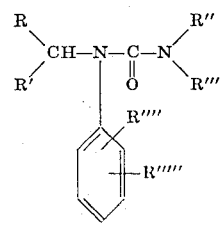

wherein R is 2-furyl, 2-tetrahydrofuryl, 3,4-dihydro-2H-2-pyranyl, or 2-tetrahydropyranyl; R' is hydrogen or $C_1$–$C_3$ alkyl; R" and R'" are hydrogen, methyl, or methoxy; or NR"R'" may form an aziridino, pyrrolidino, piperidino, or morpholino ring; and R"" and R""' are hydrogen, $C_1$–$C_6$ alkyl, $C_1$–$C_6$ alkoxy, $C_1$–$C_6$ alkylthio, $C_1$–$C_6$ alkylsulfinyl, $C_1$–$C_6$ alkylsulfonyl, chloro, bromo, fluoro, trifluoromethyl, cyano, nitro, phenoxy, halo substituted phenoxy. These compounds are useful as herbicides.

6 Claims, No Drawings

UREA DERIVATIVES OF FURFURYL AND PYRANYLMETHYL COMPOUNDS

BACKGROUND OF THE INVENTION

1. Field of the Invention

This invention is directed to phenyl ureas having furfuryl, tetrahydrofurfuryl, pyranylmethyl or tetrahydropyranylmethyl substituents and their use as herbicides.

2. Description of the Prior Art

In U.S. Pat. Nos. 2,655,445 and 3,134,665 there are disclosed certain herbicidal phenyl-substituted ureas. None of these compounds have a 5- or 6-membered oxa heterocyclic ring substituent. Insofar as is now known, the compounds of this invention have not been disclosed.

SUMMARY OF THE INVENTION

This invention provides compounds having the formula:

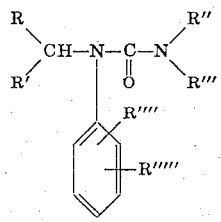

wherein R is 2-furyl, 2-tetrahydrofuryl, 3,4-dihydro-2H-2-pyranyl, or 2-tetrahydropyranyl; R' is hydrogen or $C_1$–$C_3$ alkyl; R'' and R''' are hydrogen, methyl, or methoxy; or NR''R''' may form an aziridino, pyrrolidino, piperidino, or morpholino ring; and R'''' and R''''' are hydrogen, $C_1$–$C_6$ alkyl, $C_1$–$C_6$ alkoxy, $C_1$–$C_6$ alkylthio, $C_1$–$C_6$ alkylsulfinyl, $C_1$–$C_6$ alkylsulfonyl, chloro, bromo, fluoro, cyano, trifluoromethyl, nitro, phenoxy and halo-substituted phenoxy. It also provides the method of their use as herbicides and herbicidal compositions of these compounds on a carrier.

DESCRIPTION OF SPECIFIC EMBODIMENTS

The compounds of this invention are ureas having N-furfuryl, N-tetrahydrofurfuryl, N-tetrahydro-2-pyranylmethyl, or N-3,4-dihydro-2H-2-pyranylmethyl substituent and phenyl ring-substituted derivatives as set forth in the structural formula hereinbefore. Examples of the compounds of this invention in addition to those specifically exemplified hereinafter are:

1,-1-Dimethyl-3-furfuryl-3-(3-chloro-4-methylthiophenyl) urea
1,1-Dimethyl-3-furfuryl-3-(3-chloro-4-methylsulfinylphenyl) urea
1,1-Dimethyl-3-furfuryl-3-(3-chloro-4-bromophenyl) urea
1,1-Dimethyl-3-furfuryl-3-(4-cyanophenyl)urea
1,1-Dimethyl-3-(tetrahydro-2-pyranylmethyl)-3-(3-4-dichlorophenyl)urea
1,1-Dimethyl-3-(3,4-dihydro-2H-2-pyranylmethyl)-3-(3,4-dichlorophenyl)urea
1,1-Dimethyl-3-(3,4-dihydro-2H-2-pyranylmethyl)-3-(3-trifluoromethylphenyl)urea
1,1-Dimethyl-3-tetrahydrofurfuryl-3-(3-chloro-4-methylsulfonylphenyl)urea
1-Methoxy-1-methyl-3-furfuryl-3-(3,4-dichlorophenyl)urea
1,1-Dimethyl-3-(α-n-propylfurfuryl)-3-(4-chlorophenyl)urea
1,1-Dimethyl-3-furfuryl-3-(4-nitrophenyl)urea
1,1-Dimethyl-3-furfuryl-3-(4-n-hexylphenyl)urea
1,1-Dimethyl-3-furfuryl-3-(3-chloro-4-n-hexylthiophenyl)urea
1,1-Dimethyl-3-furfuryl-3-(3-chloro-4-n-hexyloxyphenyl)urea
1,1-Dimethyl-3-(tetrahydro-2-pyranylmethyl)-3-(3-trifluoromethylphenyl)urea
1,1-Dimethyl-3-(3,4-dihydro-2H-2-pyranylmethyl)-3-(4-bromophenyl)urea
1,1-Dimethyl-3-(tetrahydro-2-pyranylmethyl)-3-(3,4-dimethylphenyl)urea
1-Methyl-3-(tetrahydro-2-pyranylmethyl)-3-(3-trifluoromethylphenyl)urea
1,1-Dimethyl-3-furfuryl-3-(3-t-butylphenyl)urea
1,1-Dimethyl-3-furfuryl-3-(3-chloro-4-n-butylphenyl)urea
1,1-Dimethyl-3-tetrahydrofurfuryl-3-(3-bromo-4-n-hexylphenyl)urea
1-Methoxy-1-methyl-3-furfuryl-3-(3-chloro-4-bromophenyl)urea
1,1-Dimethyl-3-furfuryl-3-(4-phenoxyphenyl)urea
1,1-Dimethyl-3-furfuryl-3-(4-chlorophenoxyphenyl)urea
1-Methyl-3-furfuryl-3-phenylurea
1,1-Dimethyl-3-furfuryl-3-phenylurea
1,1-Dimethyl-3-furfuryl-3-(3,4-difluorophenyl)urea
1,1-Dimethyl-3-furfuryl-3-(4-fluoro-3-nitrophenyl)urea
1,1-Dimethyl-3-tetrahydrofurfuryl-3-(2,5-difluorophenyl)urea
1,1-Dimethyl-3-furfuryl-3-(4-fluorophenyl)urea
1,1-Dimethyl-3-(tetrahydro-2-pyranylmethyl)-3-(2-fluorophenyl)urea
1,1-Dimethyl-3-furfuryl-3-(3-chloro-4-fluorophenyl)urea The compounds of this invention can be synthesized according to the equations below.

I. Preparation of N-substituted anilines (a)

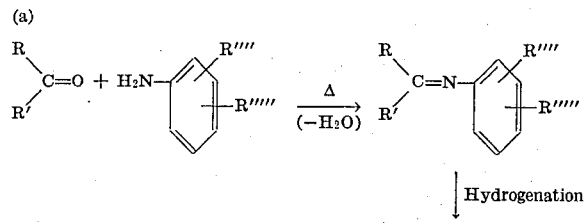

(b)

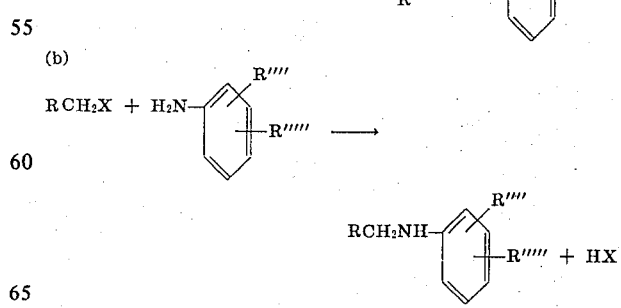

R, R', R'''' and R''''' are as aforedefined.
X=Cl,Br

II. Preparation of Ureas (a)
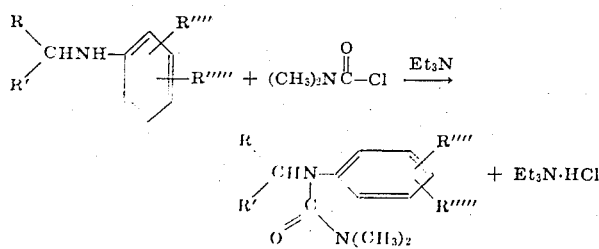

(b)
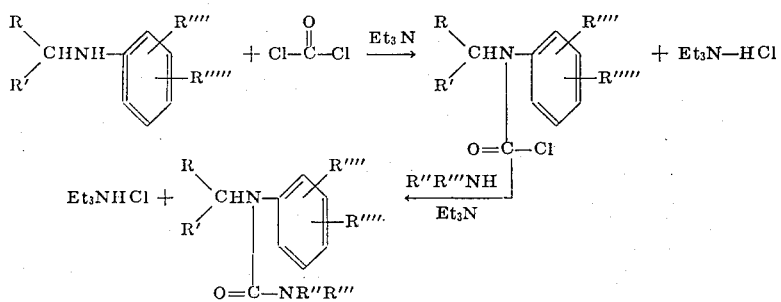

(c)
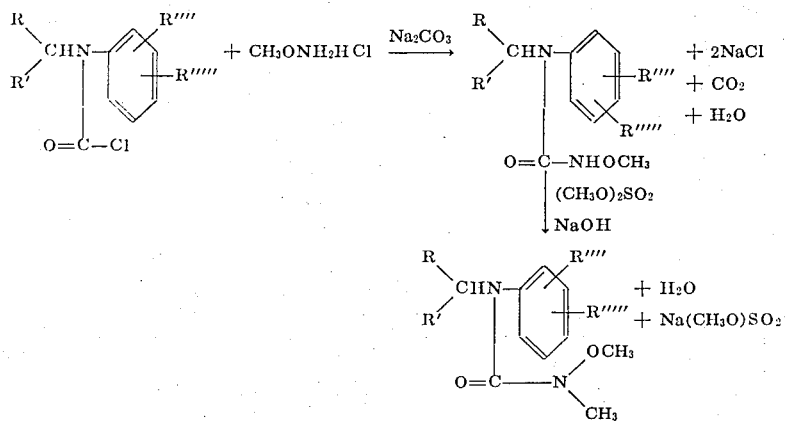

(d)
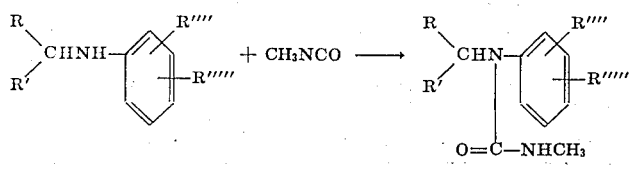

R, R', R'', R''', R'''' and R''''' are as aforedefined.

In the above synthesis, various tertiary amines, or inorganic bases may be used in place of the exemplary use of triethylamine, sodium hydroxide, etc., as stated in the equations above.

The intermediate imines as described in I(a) above were prepared according to known techniques by condensation of appropriate aldehydes or ketones (e.g., 2-furaldehyde, 2-acetylfuran, etc.) with aromatic amines in refluxing benzene, xylene, or toluene. Azeotropic removal of water via a Dean-Stark trap, followed by removal of solvent at reduced pressure gave the product imines as solids or viscous oils. In some cases the condensation reaction was catalyzed by addition of a small amount of concentrated sulfuric acid or by use of molecular sieves.

Typical aldehydes or ketones which may be used in the formation of the imines are 2-furaldehyde, 2-acetylfuran, 2-propionylfuran, and 2-butyrylfuran.

Typical aniline derivatives utilizable herein are as follows:

| | |
|---|---|
| aniline | 3-bromoaniline |
| 2-bromoaniline | 4-bromoaniline |
| 2-chloroaniline | 3-t-butylaniline |
| 3-chloroaniline | 3-methoxyaniline |
| 4-chloroaniline | 4-methoxyaniline |
| 3,4-dibromoaniline | 2-methylaniline |
| 2,3-dichloroaniline | 3-methylaniline |
| 2,4-dichloroaniline | 4-propylaniline |
| 2,5-dichloroaniline | 2-methyl-4-methoxyaniline |
| 3,4-dichloroaniline | 2-methyl-3-chloroaniline |
| 2,3-dimethylaniline | 2-methyl-4-chloroaniline |
| 2,4-dimethylaniline | 2-methyl-6-chloroaniline |
| 2,5-dimethylaniline | 3-chloro-4-methylaniline |
| 3,4-dimethylaniline | 2-t-butyl-6-methylaniline |
| 3,5-dimethylaniline | 2-trifluoromethylaniline |
| 3-ethoxyaniline | 2-methyl-5-cyanoaniline |
| 4-ethoxyaniline | 3-trifluoromethylaniline |
| 2-ethylaniline | 3-t-butylaniline |
| 3-ethylaniline | 3-chloro-4-methoxyaniline |
| 4-ethylaniline | 3-chloro-4-bromoaniline |
| 2-iodoaniline | 4-cyanoaniline |
| 3-iodoaniline | 3-chloro-4-methylthioaniline |
| 4-iodoaniline | 3-chloro-4-methylsulfinylaniline |
| 2-isopropylaniline | 3-chloro-4-methylsulfonylaniline |
| 4-isopropylaniline | 4-nitroaniline |
| 2-isopropyl-5-methylaniline | 4-n-hexylaniline |
| 2-methoxyaniline | 3-chloro-4-n-hexylthioaniline |
| 3-chloro-4-fluoroaniline | 3-chloro-4-n-hexyloxyaniline |
| 2,5-difluoroaniline | 3-chloro-4-n-butylaniline |
| 3,4-difluoroaniline | 3-bromo-4-n-hexylaniline |
| 4-fluoro-3-nitroaniline | 4-phenoxyaniline |
| 2-fluoroaniline | 4-(4-chlorophenoxy)aniline |
| 3-fluoroaniline | |
| 4-fluoroaniline | |
| 3-isopropylaniline | |
| 2-methylthioaniline | |

The following examples illustrate the synthesis of the imines.

EXAMPLE 1

N-Furfurylidene-3,4-dichloroaniline

A flask was equipped with a condenser, stirrer, and Dean-Stark trap. The flask was charged with 3,4-dichloroaniline (50.0 g, 0.308m) and 700 ml of benzene. To this stirred solution was added 2-furaldehyde and the resulting mixture was refluxed overnight to yield 5.2 ml of water collected in the Dean-Stark trap. The reaction mixture was stripped of solvent under reduced pressure and the brown oily residue was extracted with hot petroleum ether (b.p. 30°–60°C). Chilling of the hot solution yielded tan solids which were filtered and dried (42 g; m.p. 37°–38.2°C). The nuclear magnetic resonance and infrared spectra [IR (neat melt), C=N, 6.18μ] substantiated the product's structure as being N-furfurylidene-3,4-dichloroaniline.

EXAMPLE 2

N-(α-Methylfurfurylidene)-4-chloroaniline

A mixture of 2-acetylfuran (11.01 g, 0.1 m), 4-chloroaniline (12.76 g, 0.1 m), and molecular sieves (40 g, activated Linde type 5A, 60–80 mesh) in 55 ml of benzene was refluxed overnight with stirring.

The molecular sieves were filtered off, and fresh sieves (40 g) were added to the solution, which was again refluxed overnight. Removal of the sieves followed by stripping of the benzene under reduced pressure gave 19.3 g of red oil which consisted of a mixture of product and starting materials. The oil was vacuum distilled up to a boiling point of 55°C. at 0.45 mm which removed the unreacted acetylfuran and 4-chloroaniline. The residual oil (11.1 g) consisted of the desired product, and nuclear magnetic resonance and infrared spectra [IR, C=N, 6.17μ] were in agreement with the proposed structure.

The intermediate imines were reduced to the corresponding anilines either by use of sodium borohydride in methanol, sodium and alcohol, or magnesium and alcohol. N-tetrahydrofurfuryl anilines were obtained by catalytic hydrogenation of the corresponding N-furfurylanilines. The tetrahydro-2-pyranylmethyl aniline was prepared by reaction of a substituted aniline with tetrahydro-2-pyranylmethyl bromide. The particular reduction technique employed is not a critical factor of this invention. The following examples demonstrate typical reduction reactions.

EXAMPLE 3

N-Furfuryl-3,4-dichloroaniline

N-Furfurylidene-3,4-dichloroaniline (42.0 g, 0.1735 m) was dissolved in 450 ml of absolute methanol. With stirring, solid sodium borohydride (7.8 g, 0.206 m) was added portionwise with the temperature being maintained between 35° and 40°C. The reaction mixture was stirred overnight, and then refluxed briefly. Addition of 700 ml of water with stirring precipitated an oil which was extracted with benzene. The benzene extract was washed with water, dried with MgSO₄, and evaporated down under reduced pressure to yield the product as an amber oil (39 g). Infrared analysis showed the absence of the C=N absorption at 6.18μ and appearance of N—H absorption at 2.9μ.

EXAMPLE 4

N-Tetrahydrofurfuryl-3,4-dichloroaniline

A mixture of N-furfuryl-3,4-dichloroaniline (12.2 g, 0.05 m) and 5 percent rhodium/charcoal catalyst (0.6 g) in 150 ml of absolute ethanol was hydrogenated in a Parr low pressure hydrogenation apparatus (initial pressure 60 psi). The theoretical uptake of hydrogen was achieved in about 8 hours whereupon the catalyst was removed by filtration. Concentration of the filtrate yielded 10 g of the product as an amber oil, which was homogeneous by glpc.

C. Synthesis of Herbicidal Agents

The herbicidal agents of this invention may be prepared by several different methods:

I. By reaction of the N-substituted aniline with dimethylcarbamyl chloride using triethylamine or other tertiary amine as an HCl scavanger.

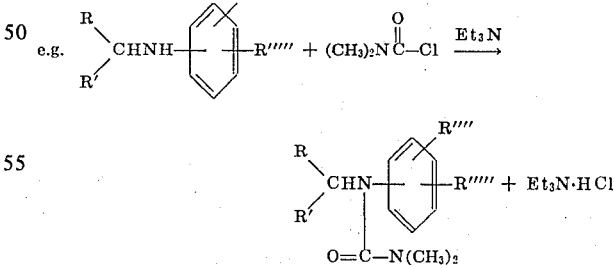

II. By reaction of the N-substituted aniline with phosgene in the presence of a tertiary amine followed by reaction of the resulting substituted carbamyl chloride with primary or secondary amines.

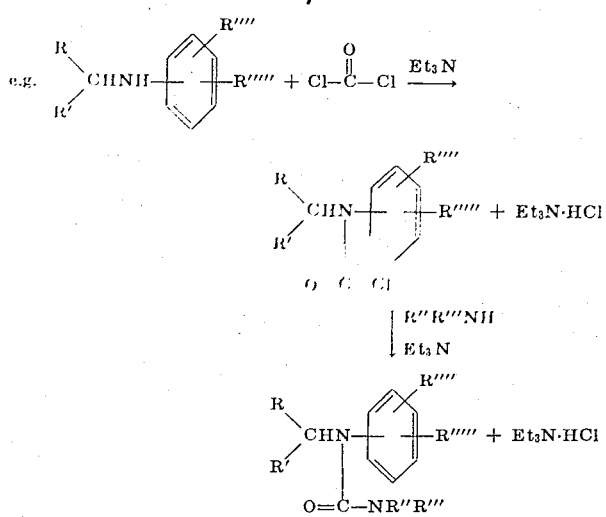

III. By reaction of a substituted carbamyl chloride (formed as in II above) with methoxyamine hydrochloride in presence of a base such as sodium carbonate, sodium hydroxide, etc., followed by N-methylation with dimethylsulfate in base.

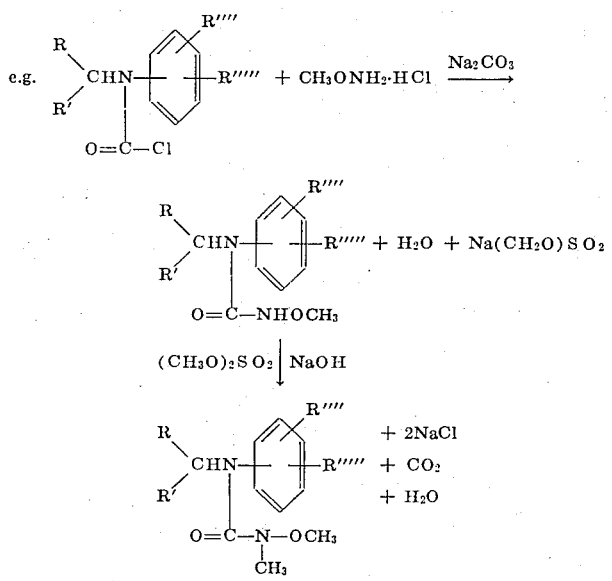

IV. By reaction of an N-substituted aniline with methylisocyanate

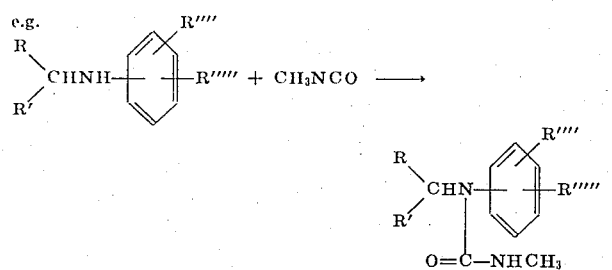

EXAMPLE 5

1,1-Dimethyl-3-furfuryl-3-(4-chlorophenyl)urea

A mixture of N-furfuryl-4-chloroaniline (6.0 g, 0.0289 m), triethylamine (3.8 g, 0.037 m) dimethylcarbamyl chloride (4.0 g, 0.037 m) and toluene (75 ml) was refluxed overnight. After cooling, the reaction mixture was stirred with 50 ml of saturated sodium bicarbonate solution for about ½ hour. The aqueous phase was removed and the residue washed consecutively with 10% HCl solution, saturated NaHCO$_3$ solution, and water. After drying the solution with MgSO$_4$, the solvent was removed under reduced pressure to yield a dark oil (5.3 g) which later crystallized. Recrystallization gave the product as a tan solid, m.p. 95°–96°C.

EXAMPLE 6

1,1-Dimethyl-3-furfuryl-3-(3,4-dichlorophenyl)urea

A flask was charged with N-furfuryl-3,4-dichloroaniline (21.0 g, 0.086 m), triethylamine (8.7 g, 0.086 m) and benzene (500 ml). This solution was chilled with an ice bath during the dropwise addition of phosgene (8.5 g, 0.086 m) in benzene. The resulting slurry was allowed to stir at room temperature overnight after which the white solids were removed by filtration. The filtrate was transferred to another flask and gaseous dimethylamine (9.0 g, 0.2 m) bubbled into the solution. After stirring for one hour, the dimethylamine hydrochloride salt was filtered off, the filtrate was washed with 10% HCl solution, saturated NaHCO$_3$ solution and water. Drying of the solution with MgSO$_4$ followed by solvent removal gave a brown solid. Recrystallization from heptane gave the product as a light tan solid (18 g), m.p. 99°–100.8°C.

EXAMPLE 7

1-Methoxy-1-methyl-3-furfuryl-3-(4-chlorophenyl)urea

To a chilled solution of N-furfuryl-4-chloroaniline (8.0 g, 0.0386 m), triethylamine (4.04 g, 0.042 m) and benzene was added a benzene solution of phosgene (4.15 g, 0.042 m) over a ½ hour period. The resulting slurry was refluxed about 15 minutes and filtered to remove the white solid amine hydrochloride. Stripping of solvent yielded the intermediate carbamyl chloride as a dark oil, which was redissolved in ethanol and added dropwise to a slurry of methoxyamine hydrochloride (3.34 g, 0.04 m) and sodium carbonate (4.66 g, 0.044 m) in ethanol-water. The mixture was refluxed for about ½ hour and then stirred overnight at room temperature. The ethanol and some water was removed under reduced pressure and the residue extracted with benzene. This benzene solution after the usual acid/base workup gave 1-methoxy-3-furfuryl-3-(4-chlorophenyl)urea as a crude dark oil (8 g).

This intermediate (7.0 g) was dissolved in methanol (60 ml) and to this solution was added sodium hydroxide (1.07 g) in 4 ml of water, followed by dropwise addition of dimethylsulfate (3.34 g) over a period of 5 minutes. The temperature rose to 37°C., and external heating was applied to maintain 60°–65°C. for 1½ hours. Methanol was removed under reduced pressure and the residue taken up in ether and the ethereal solution washed with 10% HCl, saturated NaHCO$_3$, and water. The dark oil (6.8 g) which was isolated was found to contain unreacted starting material as well as product by n.m.r. spectroscopy. Therefore the oil was retreated as above with additional dimethylsulfate and sodium hydroxide. Similar workup gave an oil (5.8 g) which solidified. This was recrystallized from heptane/acetone to yield the product which melted at 63°–66°C.

EXAMPLE 8

1-Methyl-3-furfuryl-3-(3-chloro-4-methylphenyl)urea

N-Furfuryl-N-(3-chloro-4-methylphenyl) carbamyl chloride (formed by reaction of the appropriate aniline with phosgene as in Example 6) (10 g, 0.0352 m) was dissolved in 250 ml of benzene. After chilling the solution to 10°C., excess monomethylamine was bubbled through the solution. The resulting amine hydrochloride salt was removed by filtration and the filtrate washed with 10% HCl, saturated $NaHCO_3$ solution, and brine solution. Drying of the solution with $MgSO_4$ followed by removal of solvent yielded a dark solid which was purified by recrystallization from heptane.

The yellow product (5.1 g) melted at 91°–93°C.

In similar fashion the following compounds were prepared according to procedures outlined above. All products were analyzed by n.m.r. and infrared-spectroscopy and found to be consistent with the proposed structures.

EXAMPLE 9

1,1-Dimethyl-3-furfuryl-3-(3-trifluoromethylphenyl)urea, amber oil, formed by reaction of dimethylamine with N-furfuryl-N-(3-trifluoromethylphenyl)carbamyl chloride.

EXAMPLE 10

1,1-Dimethyl-3-furfuryl-3-(3-chloro-4-methylphenyl)urea, m.p. 66.5°–67.8°C. prepared by reaction of dimethylamine with N-furfuryl-N-(3-chloro-4-methylphenyl)carbamyl chloride.

EXAMPLE 11

1,1-Dimethyl-3-furfuryl-3-(3-chloro-4-methoxyphenyl)urea, m.p. 94°–7°C., prepared by reaction of dimethylamine with N-furfuryl-N-(3-chloro-4-methoxyphenyl)carbamyl chloride.

EXAMPLE 12

1,1-Dimethyl-3-furfuryl-3-(3-chlorophenyl)-urea, amber oil, prepared by reaction of dimethylamine with N-furfuryl-N-(3-chlorophenyl)carbamyl chloride.

EXAMPLE 13

1-Methyl-3-furfuryl-3-(4-chlorophenyl)urea, m.p. 94°–96°C., prepared by reaction of N-furfuryl-4-chloroaniline with methyl isocyanate.

EXAMPLE 14

1-Methyl-3-furfuryl-3-(3-trifluoromethylphenyl)urea, viscous oil, prepared by reaction of N-furfuryl-3-trifluoromethylaniline with methyl isocyanate.

EXAMPLE 15

1-Methyl-3-furfuryl-3-(3-chlorophenyl)urea, m.p. 60°–63°C., prepared by reaction of monomethylamine with N-furfuryl-N-(3-chlorophenyl) carbamyl chloride.

EXAMPLE 16

1,1-Dimethyl-3-tetrahydrofurfuryl-3-(4-chlorophenyl)urea, viscous brown oil, prepared by reaction of dimethylamine with N-tetrahydrofurfuryl-N-(4-chlorophenyl)carbamyl chloride.

EXAMPLE 17

1,1-Dimethyl-3-tetrahydrofurfuryl-3-(3-chlorophenyl)urea, brown oil, prepared by reaction of dimethylamine with N-tetrahydrofurfuryl-N-(3-chlorophenyl)carbamyl chloride.

EXAMPLE 18

1,1-Dimethyl-3-tetrahydrofurfuryl-3-(3,4-dichlorophenyl)urea, b.p. 170°–80°C./0.65 mm, prepared by reaction of dimethylamine with N-tetrahydrofurfuryl-N-(3,4-dichlorophenyl)carbamyl chloride.

EXAMPLE 19

1,1-Dimethyl-3-(α-methylfurfuryl)-3-(4-chlorophenyl)urea, b.p. 146°–54°C./0.2 mm., prepared by reaction of dimethylamine with N-(α-methylfurfuryl)-N-(4-chlorophenyl)carbamyl chloride.

EXAMPLE 20

1,1-Dimethyl-3-furfuryl-3-(4-bromophenyl)-urea, m.p. 98.5°–100°C., prepared by reaction of dimethylamine with N-furfuryl-N-(4-bromophenyl)-carbamyl chloride.

EXAMPLE 21

1,1-Dimethyl-3-(tetrahydro-2-pyranylmethyl)-3-(4-chlorophenyl)urea, amber oil, prepared by reaction of dimethylamine with N-(tetrahydro-2-pyranylmethyl)-N-(4-chlorophenyl)carbamyl chloride.

The compounds of this invention can be applied in various ways to achieve herbicidal action. They can be applied, per se, as solids or in vaporized form, but are preferably applied as the toxic components in herbicidal compositions comprising the compound and a carrier. The compositions can be applied as dusts, as liquid sprays, or as gas-propelled sprays and can contain, in addition to a carrier, additives such as emulsifying agents, binding agents, gases compressed to the liquid state, odorants, stabilizers, and the like. A wide variety of liquid and solid carriers can be used. Nonlimiting examples of solid carriers include talc, bentonite, diatomaceous earth, pyrophyllite, fullers earth, gypsum, flours derived from cotton seeds and nut shells, and various natural and synthetic clays having a pH not exceeding about 9.5. Nonlimiting examples of liquid carriers include water, organic solvents such as alcohols, ketones, amides and esters; mineral oils such as kerosene, light oils, and medium oils, and vegetable oils, such as cottonseed oil.

In practice, herbicidal application is measured in terms of pounds of herbicide applied per acre. The compounds of this invention are effective herbicides when applied in herbicidal amounts, i.e., at rates between about 0.2 pounds and about 10 pounds per acre.

HERBICIDAL EFFECTIVENESS

Method of Propagating Test Species

Crabgrass: Digitaria sanguinalis
Johnson grass: Sorgum Halepense
Barnyard grass: Echinochloa crus-galli
Amaranth pigweed: Amaranthus retroflexus
Turnip: Brassica sp.
Cotton: Gossypium hirsutum var. DPL smooth leaf.
Corn: Zea Mays var. Golden Bantam.

All crop and weed species are planted individually in 3 inch plastic pots containing potting soil. Four seeds of each of corn, cotton, and snapbeans are seeded to a depth equal to the diameter of the seed. All other species are surface seeded and sprinkled with screened soil in an amount sufficient to cover the seeds. Immediately after planting, all pots are watered by sub-irrigation in greenhouse trays. Pots for the pre-emergence phase are seeded one day before treatment.

Planting dates for the post-emergence phase are varied so that all the seedlings will reach the desired stage of development simultaneously. The proper stage of seedling development for treatment in the post-emergence phase is as follows:

| | |
|---|---|
| Crabgrass | 2 inches in height |
| Turnips | 1 or 2 true leaves visible above cotyledons. |
| Cotton | First true leaf 1 inch in length; expanded cotyledons. |

Method of Treatment

Spray applications are made in a hood containing a moveable belt and fixed spray nozzle. For passage through the spray hood, one pot of each species (pre-emergence phase) is placed on the forward half of a wooden flat and one pot of established plants (post-emergence phase) is placed on the rear half of the flat. Treatments are moved to the greenhouse after spraying. Watering during the observation period is applied only by sub-irrigation.

Compounds are screened initially at a rate of application equivalent to 10 pounds per acre. Two weeks after treatment the pre- and post-emergence percent injury is visually rated. Subsequent testing was carried out at 2 pounds per acre.

Herbicidal testing of the compounds of Examples 5 through 21 and of the comparative compounds showed the results set forth in Table I. The plants are tabled using the following abbreviations:

| | |
|---|---|
| Crabgrass | CG |
| Johnson grass | JG |
| Barnyard grass | BG |
| Morning glory | MG |
| Pigweed | PW |
| Turnip | TP |
| Cotton | CT |
| Corn | CN |

The rating system used in 0–100 where 100 indicates complete eradication (100 percent control) of the test species.

TABLE I

| Example Number | Lbs per Acre | Preemergence | | | | | | | | Postemergence | | |
|---|---|---|---|---|---|---|---|---|---|---|---|---|
| | | CG | JG | BG | TP | PW | MG | CT | CN | CG | TP | CT |
| 5 | 10 | 100 | 90 | 100 | 100 | — | — | 0 | — | 40 | 100 | 70 |
|   | 2  | 90  | 30 | 70  | 90  | 100 | 0 | 0 | 3 | 40 | 100 | 70 |
| 6 | 2  | 100 | 60 | 90  | 100 | 100 | 0 | 30 | 40 | 100 | 100 | 80 |
|   | 1  | 80  | 0  | 20  | 60  | 80  | — | 30 | 40 | 90 | 80 | 40 |
| 7 | 10 | 80  | 20 | 80  | 100 | —   | — | 30 | 0 | — | — | 90 |
|   | 2  | 50  | 20 | 30  | 60  | 100 | 0 | 0 | 0 | 20 | 90 | 30 |
| 8 | 10 | 60  | 20 | 0   | 40  | —   | 30 | 0 | 0 | 90 | 90 | 50 |
| 9 | 10 | 90  | 70 | 70  | 60  | —   | — | 0 | 40 | 40 | 60 | 60 |
|   | 2  | 90  | 0  | 30  | 60  | 90  | 0 | 0 | 0 | 0 | 60 | 0 |
| 10 | 10 | 90 | 80 | 100 | 40  | 70  | 0 | 0 | 0 | 100 | 100 | 80 |
|    | 2  | 90 | 20 | 60  | 20  | 40  | 0 | 0 | 0 | 40 | 90 | 50 |
| 11 | 10 | 90 | 0  | 90  | 90  | 90  | 0 | 0 | 20 | 100 | 100 | 80 |
|    | 2  | 80 | 0  | 30  | 30  | 40  | 0 | 0 | 20 | 30 | 90 | 60 |
| 12 | 10 | 90 | 0  | 80  | 100 | —   | — | 0 | 80 | — | — | 80 |
|    | 2  | 80 | 0  | 50  | 50  | 90  | 0 | 0 | 20 | 50 | 90 | 20 |
| 13 | 10 | 60 | 0  | 0   | 40  | 70  | 50 | 0 | 0 | 0 | 100 | 30 |
| 14 | 10 | 40 | 0  | 0   | 50  | 50  | 40 | 0 | 0 | 0 | 100 | 0 |
| 15 | 10 | 80 | 20 | 0   | 50  | 60  | 0 | 0 | 20 | 30 | 90 | 0 |
| 16 | 10 | 90 | 50 | 80  | 90  | 90  | 50 | 20 | 30 | 40 | 100 | 80 |
|    | 2  | 0  | 0  | 20  | 20  | 0   | 0 | 0 | 30 | — | — | — |
| 17 | 10 | 90 | 30 | 40  | 60  | 20  | 50 | 0 | 0 | 90 | 100 | 40 |
|    | 2  | 50 | 20 | 40  | 20  | —   | 30 | 0 | 0 | — | — | — |
| 18 | 10 | 30 | 0  | 20  | 40  | —   | 40 | 0 | 20 | 100 | 90 | 50 |
| 19 | 10 | 90 | 80 | 90  | 90  | —   | — | 30 | 40 | 100 | 100 | 100 |
|    | 2  | 80 | 20 | 20  | 80  | —   | 0 | 30 | 0 | 90 | 100 | 80 |
| 20 | 10 | 100 | 90 | 100 | 100 | — | — | 0 | 100 | 100 | 100 | 100 |
|    | 2  | 80 | 20 | 0   | 70  | —   | — | 0 | 0 | 70 | 100 | 30 |
| 21 | 10 | 80 | 50 | 40  | 90  | —   | — | 30 | 40 | 100 | 100 | 50 |

Although the present invention has been described with preferred embodiments, it is to be understood that modifications and variations may be resorted to, without departing from the spirit and scope of this invention, as those skilled in the art will readily understand. Such variations and modifications are considered to be within the purview and scope of the appended claims.

What is claimed is:

1. A compound of the formula:

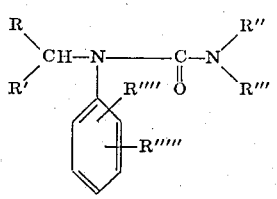

wherein R is 2-furyl, 2-tetrahydrofuryl, 3,4-dihydro-2H-2-pyranyl, or 2-tetrahydropyranyl; R' is hydrogen or $C_1$–$C_3$ alkyl; R'' is hydrogen, methyl, or methoxy; R''' is methyl or methoxy; and R'''' and R''''' are hydrogen, $C_1$–$C_6$ alkyl, $C_1$–$C_6$ alkoxy, $C_1$–$C_6$ alkylthio, $C_1$–$C_6$ alkylsulfinyl, $C_1$–$C_6$ alkylsulfonyl, chloro, bromo, fluoro, cyano, trifluoromethyl, nitro, phenoxy or halo-substituted phenoxy.

2. A compound of claim 1, wherein said compound is 1,1-dimethyl-3-furfuryl-3-(4-chlorophenyl)urea.

3. A compound of claim 1, wherein said compound is 1,1-dimethyl-3-furfuryl-3-(3,4-dichlorophenyl)urea.

4. A compound of claim 1, wherein said compound is 1,1-dimethyl-3-furfuryl-3-(3-trifluoromethylphenyl)urea.

5. A compound of claim 1, wherein said compound is 1,1-dimethyl-3-furfuryl-3-(3-chloro-4-methylphenyl)urea.

6. A compound of claim 1, wherein said compound is 1,1-dimethyl-3-furfuryl-3-(3-chloro-4-methoxyphenyl)urea.

* * * * *